United States Patent [19]

Green et al.

[11] 4,333,723

[45] Jun. 8, 1982

[54] FULL FRAME FLASH ILLUMINATION SYSTEM UTILIZING A DIFFUSE INTEGRATING OPTICAL CAVITY

[75] Inventors: Frederick A. Green, Fairport; George R. Simpson; Stephen T. Avery, both of Rochester; John A. Durbin, Webster, all of N.Y.

[73] Assignee: Xerox Corporation, Stamford, Conn.

[21] Appl. No.: 114,480

[22] Filed: Jan. 23, 1980

Related U.S. Application Data

[63] Continuation of Ser. No. 15,557, Feb. 26, 1979, abandoned.

[51] Int. Cl.³ ............................................. G03B 27/72
[52] U.S. Cl. ..................................................... 355/71
[58] Field of Search .................. 355/67, 69, 71, 8, 11, 355/50, 119; 362/16

[56] References Cited

U.S. PATENT DOCUMENTS

| | | | |
|---|---|---|---|
| 3,428,397 | 2/1969 | Elmer | 355/70 X |
| 3,498,715 | 3/1970 | Gold | 355/70 |
| 3,586,849 | 6/1971 | Starkweather | 355/70 X |
| 3,669,538 | 6/1972 | Fowler | 355/67 X |
| 3,947,115 | 3/1976 | Hamaguchi | 355/67 X |
| 3,977,784 | 8/1976 | Hara | 355/67 |
| 4,089,602 | 5/1978 | Noguchi et al. | 355/69 |
| 4,225,923 | 9/1980 | Bloemendaal et al. | 355/67 X |

OTHER PUBLICATIONS

IBM Technical Disclosure Bulletin, "Illumination to Eliminate Shadows", Bersot et al., vol. 15, No. 2, Jul. 1972, p. 521.

Primary Examiner—Richard A. Wintercorn

[57] ABSTRACT

An illumination system for a document copying machine including an optical cavity having interior walls coated with a white, diffusely reflecting material. One end of the cavity contains a platen for positioning a document to be copied while the opposing end contains a lens for forming an image of the document on a light sensitive image plane. Illumination from a single flash illumination source located within the cavity, undergoes multiple reflections from the walls resulting in a uniform diffuse illumination of the document. An optical element is positioned above the lamp to prevent direct light from striking the platen and, in a preferred embodiment, has an aperture therein for increasing illumination of the platen area overlying the lamp-blocker mounting.

7 Claims, 3 Drawing Figures

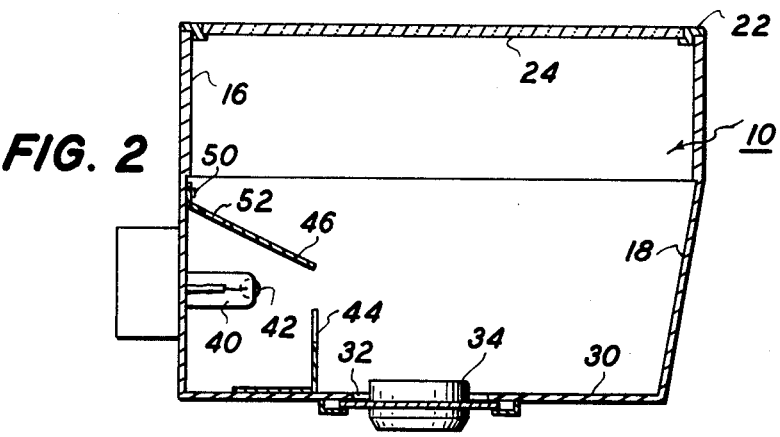
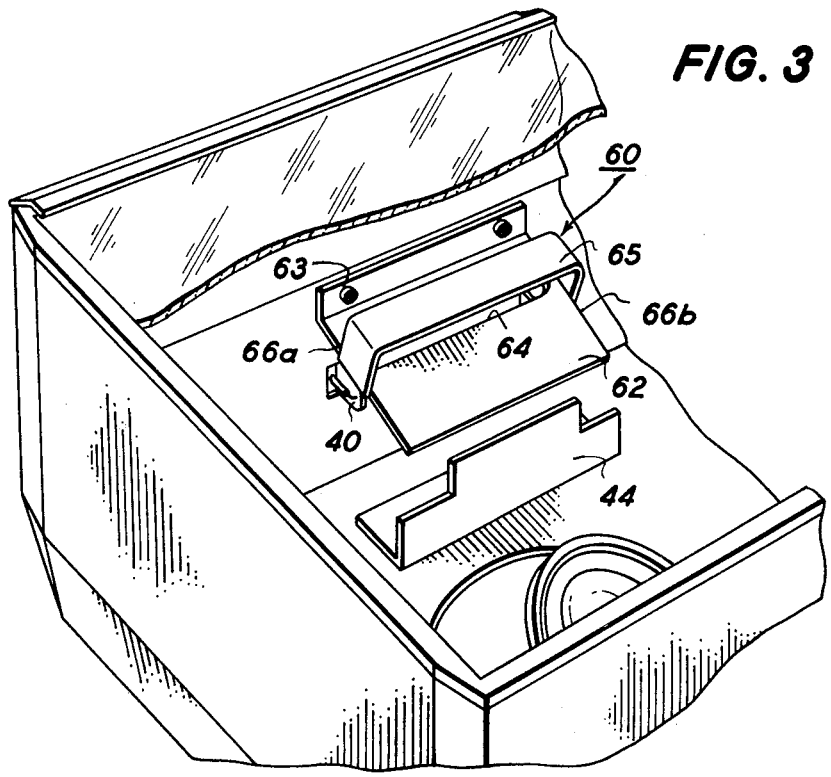

FULL FRAME FLASH ILLUMINATION SYSTEM UTILIZING A DIFFUSE INTEGRATING OPTICAL CAVITY

This is a continuation of application Ser. No. 015,557, filed, Feb. 26, 1979 now abandoned.

BACKGROUND OF THE INVENTION

The present invention relates generally to an illumination system in a document copying machine and more particularly, to a full frame flash illumination system utilizing an integrating cavity as the light housing.

As demands for faster copying and duplicating have increased, conventional machines which scan documents in incremental fashion to provide a flowing image on a xerographic drum have proved inadequate. New high speed techniques have evolved which utilize flash exposure of an entire document (full-frame) and the arrangement of a moving photoconductor in a flat condition at the instant of exposure.

PRIOR ART STATEMENT

In prior art flash illumination systems, the illumination at the document plane can be generally characterized as either wholly specular, or partially specular, partially diffuse. U.S. Pat. Nos. 3,777,135; 3,586,849 and 3,669,538 are typical of optical systems of the former type. In each of the disclosed systems, light from a plurality of flash lamps is directly reflected, by means of reflective elements partially enclosing the lamps, toward the object to be illuminated, i.e. a document lying on a platen. Light reflected from the document passes through a lens to be focused onto the image plane. However, a significant portion of the light generated by the light source is absorbed by the housing walls or passes out of the illumination area, prior to, and following incidence on, the platen. These illumination losses reduce the amount of light reaching the lens and, therefore, to achieve adequate exposure, a plurality of high intensity light sources utilizing large and costly power supplies are required.

Significant gains in illumination efficiency are obtained if the light sources are enclosed within an integrating cavity whose walls are made of, or coated with, a diffuse reflecting material. The theoretical implications of diffusely illuminating an object by causing multiple reflections within an "integrating sphere" is set forth in *Principle of Optics,* pp. 278-283, (McGraw Hill, 1932). It is therein disclosed that, if the interior wall of a sphere is coated with a white, diffusely reflecting material with high reflectance, multiple reflections within the sphere produce an almost uniform diffuse illumination of an object plane. Copier illumination systems disclosed in U.S. Pat. Nos. 3,197,177 (Booth); 3,498,715 (Gold) and 3,428,397 (Elmer) have attempted to utilize this principle with varying degrees of success. A diffusely reflecting integrating cavity has also been used to achieve uniform fixing of a developed xerographic image as disclosed in U.S. Pat. No. 3,529,129 (Rees).

The Gold and Elmer references are representative of optical systems which illuminate an object plane with light that is both diffuse and specular. In Gold, a pair of lamps are partially enclosed by baffles with reflective interiors. The lamps directly illuminate the object plane with increased illumination directed towards the end of the support by the baffles and by diffuse reflecting surfaces located above the lamps. The housing, however, is not a true integrating cavity since the chamber is not wholly enclosed and many areas are blackened to achieve the specific purposes set forth in the disclosure.

Elmer also uses a pair of lamps partially enclosed by specular reflective elements. A pair of side walls opposite the reflectors provide a first primary diffuse reflection of light from the opposing light source. The end walls provide a second specular reflection of the diffuse illumination incident thereon. This arrangement provides illumination at the object plane which is substantially diffuse and with greater intensity at the edges.

The Booth reference has a pair of light sources which are contained in the upper compartment of a two chamber cavity. Direct rays from the light sources are prevented from going through the lens by making the bottom chamber of narrower cross-section so the top edges intercept the direct rays. The interior housing walls are coated with a diffuse reflecting material except for a darkened area on one of the walls. The object plane is illuminated by direct light from the lamps and diffuse illumination after multiple reflections from the cavity walls.

In copending application, Ser. No. 015,558, (D/78087), Durbin et al, a single flash lamp is disposed within an integrating cavity whose interior surfaces are entirely coated with a diffuse reflective material. In one embodiment, the lamp is partially enclosed by a blocker element which acts to prevent direct light flashes from being viewed from a position above the platen. The present invention discloses additional blocker element configurations which improve the distribution of light in areas of the platen overlying the lamp while maintaining the desired exposure levels at the image plane. None of the prior art references disclose these blocker configurations.

SUMMARY OF THE INVENTION

It is therefore an object of this invention to provide improved platen illumination in optical systems by using a single flash lamp source within a diffusely reflecting integrating cavity chamber.

It is a further object to provide improved platen illumination while maintaining desired exposure levels at an image plane.

These objects are accomplished according to the invention by providing an enclosed light housing having top and bottom surfaces accommodating a document platen and lens respectively, and having connecting side walls, the interior surfaces of said housing being completely coated with a high reflectivity material. A single illumination source, positioned within the housing is intermittently pulsed and the flash illumination, after undergoing multiple reflections from the housing walls, uniformly and diffusely irradiates the platen. An optical element is positioned between the lamp and a platen to prevent direct light from the lamp reaching the platen. In a preferred embodiment, the element has an aperture located therein so as to allow increased light to indirectly irradiate areas of the platen overlying the element.

DESCRIPTION OF THE DRAWINGS

FIG. 2 is a sectional view taken along line 2—2 of FIG. 1.

FIG. 3 is another perspective view showing an alternate blocker construction.

DESCRIPTION

Figure 1:
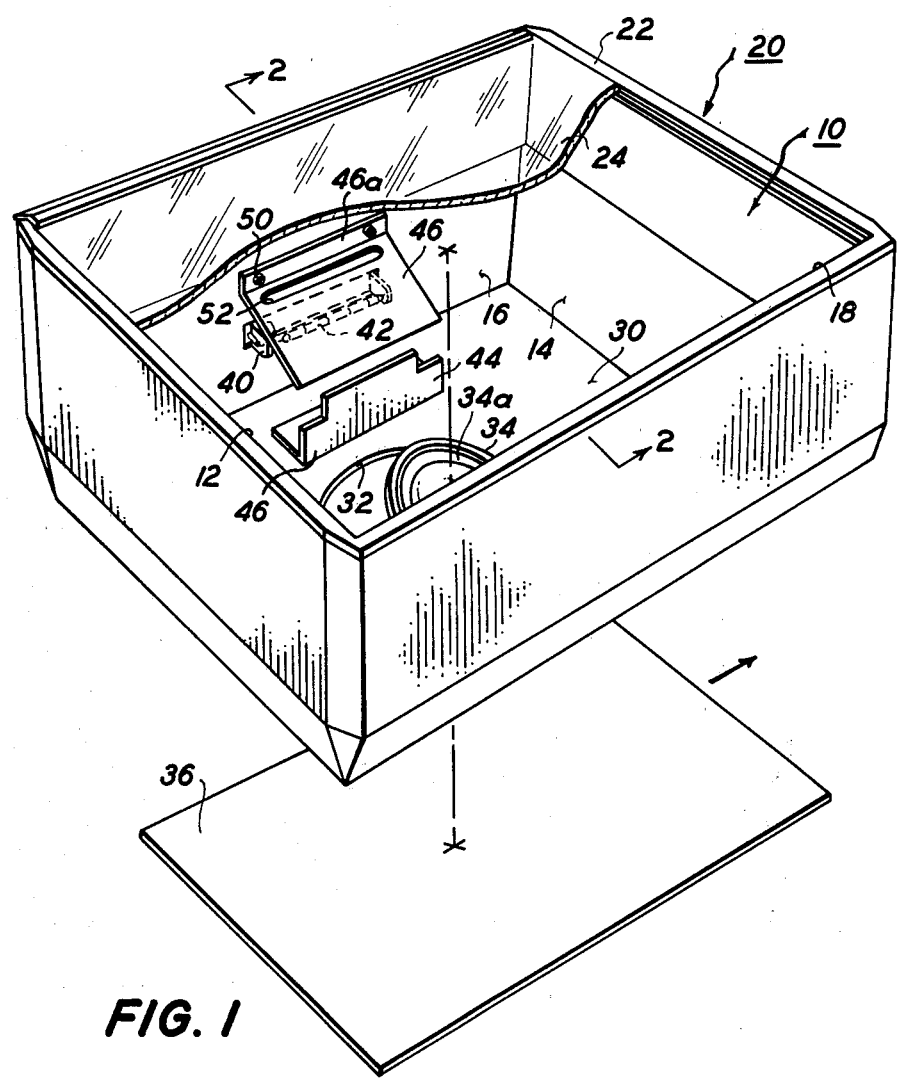
FIG. 1 is a partial perspective view of the illumination housing of the present invention showing a first embodiment of a lamp and blocker arrangement.

The blocker element configurations of the present invention are especially suited for use in a system as described in the above-noted Durbin et al. application and therefore, the Durbin et al system and the use of the present invention within that system will firstly be described below.

Referring to the drawings, FIGS. 1 and 2 illustrate a first embodiment of an integrating optical cavity containing a single flash lamp having a blocking element partially enclosing the lamp according to the invention.

A completely enclosed housing 10 is generally rectangular in shape having a first pair of opposing side walls 12, 14 and a second pair of opposing side walls 16, 18. An upper, or top wall 20 includes a rectangular aperture 22 which, at the center thereof, accommodates a glass platen 24 forming the object plane. The platen may have a hinged cover (not shown) which may be pivoted upward to permit open platen copying of materials such as books.

The lower, or bottom, wall 30 has an aperture 32 therein which accommodates a circular lens housing 34. An image plane 36, which may be, for example, a photoconductive sheet to which a charge has been applied, is positioned for exposure to light reflected from a document placed on platen 24 and transmitted by lens 34. The projected light image selectively discharges the photoconductive sheet resulting in formation of a latent electrostatic image thereon.

Mounted in the lower half of side wall 16 by bracket 40 is flash illumination source 42, which is of relatively short length compared to the platen length in the same direction. Source 42 in a preferred embodiment is a lamp consisting of an envelope containing Xenon gas and a pair of electrodes at each end which are not electrically connected to each other. The lamp is connected to pulsing triggering circuitry (not shown) which may consist of a DC power supply connected across a storage capacitor which in turn is connected to the flash lamp through an inductor. When the pulsing circuit is activated, the lamp undergoes a gas breakdown which, in turn, pulses the lamp resulting in a flash of appropriate duration. In operation, the lamp is periodically energized in timed relation to the movement of the image plane past the lens.

The interior walls of the cavity (12, 14, 16, 18, and 30) and barrel 34a of lens housing 34 have substantially diffuse reflecting surfaces resulting from coating the interior wall surfaces with a high reflectivity (90%) material. Paints such as a Celanese polyester thermal setting paint #741.13 or Glidden Enamel #424-W-02100 in cellosolve acetate thinner have been found to be acceptable materials.

A first thin blocker element 44 is secured to bottom wall 30 and projects upwardly and laterally a sufficient distance to prevent direct light from lamp 42 from reaching lens 34. Element 44 is of generally rectangular shape except for the omission of the upper corners.

The surfaces of element 44 may be coated with the same reflecting material which comprises the coating for the internal cavity walls.

According to the present invention a second blocker element 46 is mounted above source 42 and secured to wall 16 by screws 50 fastened through end portion 46a. Located at the end of the blocker closest to the wall is aperture 52. Blocker 46 projects at a downward angle relative to wall 16 and is of sufficient width and length to prevent direct light from source 42 from being viewed from any portions of platen 24.

Blocker element 46 can be constructed of any lightweight opaque material; the purpose of the blocker is to protect an operator from direct flash illumination in situations where the job requirements call for an open platen. The blocker should therefore be of sufficient length and width to completely block a view of the lamp from any point on the platen. Blocker 44 can also be constructed of a lightweight opaque material. Its function is two-fold; to prevent direct light from source 42 from entering the lens and for preventing a "hot spot" of intense illumination from forming. The "hot spot", in the absence of the blocker would result from the direct light striking in front of the lens surface by light reflecting downward from the bottom of blocker 46, and directly from the lamp.

Because of the relatively close positioning of blockers 44 and 46 to the lamp, the diffusely reflecting surfaces facing the lamp may, for some systems, inefficiently direct light to the interior walls. It may, therefore, be desirable to form one or both surfaces facing the lamp with a polished aluminum surface to provide specular instead of diffusely reflection at that surface.

As shown in FIGS. 1 and 2, aperture 52 is located at the extreme end of blocker 46. The purpose of aperture 52 is to permit entry of a portion of direct light from lamp 42 into the area above the blocker. It has been found that without the presence of aperture 52, illumination of the platen area generally located above blocker 46 may be lower than the remainder of the platen. The irradiance level is increased by permitting direct light to exit through aperture 52, reflect off wall 16 and onto the platen. The location of aperture 52 may be varied somewhat provided light is not directly visible through the aperture from any point in the platen.

FIG. 3 shows another optical blocking configuration according to the present invention. A blocker assembly 60 is positioned above the lamp. Assembly 60 consists of a bottom plate 62 having an aperture 64 in a generally central location. Plate 62 projects at a downward angle relative to wall 16 and is secured to the wall by screws 63. A generally U-shaped member 65 is secured to the surface of plate 62 along edges 66a, 66b. Member 65 straddles aperture 64 and prevents any direct light exiting from the aperture from reaching the platen. The dimensions of plate 62 are otherwise sufficient to prevent any direct light from lamp 42 from reaching the platen.

It is noted that with this FIG. 3 configuration, the aperture can be made more centrally located than the previously described embodiment. The light existing from aperture 64 is now reflected from the bottom surface of member 65 and, following an additional reflection from the top surface of plate 62, proceeds upwardly in a more evenly distributed fashion.

As in the blocker embodiments of FIGS. 1 and 2, various combinations of diffusely or specularly reflective coatings may be applied to the surfaces of the plate 62 and member 65.

Referring again to FIGS. 1 and 2, an efficient flash illumination system is realized when utilizing as the illumination source, a Xenon lamp with an overall length of between 12.7 and 17.8 cm and producing a nominal energy of 40 joules at a wavelength of 400 to 700 nm. The lamp, as shown, is mounted approximately ⅓ the height of wall 16 but other locations are possible dependent upon system requirements (so long as the lamp remains outside of the lens field of view).

For the FIG. 3 embodiment, blocker element 44 and blocker assembly 60 can be constructed of any lightweight opaque material such as aluminum. The purpose of blocker assembly 60 is to protect an operator from direct flash illumination in situations where the job requirements call for an open platen while at the same time permitting passage of sufficient illumination from lamp 42 to provide a platen illumination above the assembly uniform with that of non-overlying areas. The function of blocker 44 is as previously described.

It may be desirable, for certain applications, that the blockers 44, 46 or the component parts of blocker assembly 60 be translucent. For example, when documents having a relatively large amount of grey background area are to be copied, the light reflecting from these dark areas only partially discharge the charge on the photoreceptor image plane. The image of blocker assembly 46 or 60 reflected from the partially reflecting platen, is in these circumstances, visible as a super-imposition on the partially discharged image plane. Making the assembly translucent greatly reduces the unwanted blocker image.

Because of the relatively close positioning of blockers 46, 62 and 44 to the lamp, the diffusely reflecting surfaces facing the lamp may, for some systems, inefficiently direct light to the interior walls. It may, therefore, be desirable to make the blocker surfaces facing the lamp of a specular reflecting material such as polished aluminum.

From the foregoing, it will be appreciated that integrating cavity 10 is constructed to approximate an integrating sphere and hence is beneficiary to the increase in irradiance which is characteristic of such a construction.

It will be appreciated that when source 42 is pulsed and caused to flash, light is directed against the cavity walls, and after undergoing multiple reflections from all interior surfaces a near-uniform diffuse illumination is produced over the platen. Additional direct light passing through the blocker aperture in the various embodiments adds to the illumination of the overlying platen area. Significantly, light reflected from the document itself and not directly entering the lens will undergo additional reflections and contribute further to platen irradiance. The underside and topside of the platen may be coated, if desired with one or two coatings of an anti-reflection material such as $M_gf_2$ or multilayer of anti-reflective material. As is well known in the art, this material will prevent any platen-derived specular reflection from entering the lens. or multilayer of antireflective material. As is well known in the art, this material will prevent any platen-derived specular reflection from entering the lens.

What is claimed is:

1. A full frame, flash illumination system for a document copying machine comprising:
    a housing having a top surface defining an object plane and containing a platen for supporting a document to be copied, a bottom surface accommodating a lens for focusing an image of a document onto an image plane, said housing completely enclosed by side walls joined to said top and bottom surfaces, said housing further characterized by having its interior surfaces completely covered with a high reflectivity material such that said surfaces are highly diffusely reflective to light incident thereon,
    a single flash illumination source positioned within said housing between said top and bottom surfaces,
    a blocking element positioned between the source and the platen of sufficient length and width to prevent direct illumination from the source from reaching any portion of the platen, said element including an aperture therein, and
    means to intermittently pulse said illumination source to produce light flashes of pre-defined direction and intensity a portion of said light passing through said aperture, said flashes undergoing multiple reflections from said coated surfaces to achieve a uniformly diffuse irradiation at the platen.

2. The illumination system of claim 1 wherein said blocker element has an additional blocking element overlying but spaced apart from said aperture, said overlying blocking element intercepting and reflecting light emerging from said aperture.

3. The illumination system of claim 1 or 2 wherein the surfaces of said blocking element are coated with a high reflectivity material.

4. The illumination system of claim 2 wherein a first surface of said blocking elements receiving direct light from said source has a specularly reflective surface while the second surface of each blocker is coated with a diffusely reflective material.

5. The illumination system of claims 1 or 2 wherein the blocking elements are translucent.

6. The illumination system of claim 1 wherein said platen is coated on both sides with an anti-reflection material.

7. A full frame, flash illumination system for a document copying machine comprising:
    a housing having a top surface defining an object plane and containing a platen for supporting a document to be copied, a bottom surface accommodating a lens for focusing an image of a document onto an image plane, said housing completely enclosed by side walls joined to said top and bottom surfaces, said housing further characterized by having its interior surfaces completely covered with a high reflectivity material such that said surfaces are highly diffusely reflective to light incident thereon,
    at least one flash illumination source positioned within said housing between said top and bottom surfaces,
    a blocking element positioned between the source and the platen of sufficient length and width to prevent direct illumination from the source from reaching any portion of the platen, said element including an aperture therein, and
    means to intermittently pulse said illumination source to produce light flashes of pre-defined direction and intensity a portion of said light passing through said aperture, said flashes undergoing multiple reflections from said coated surfaces to achieve a uniformly diffuse irradiation at the platen.

* * * * *